Patented Sept. 22, 1953

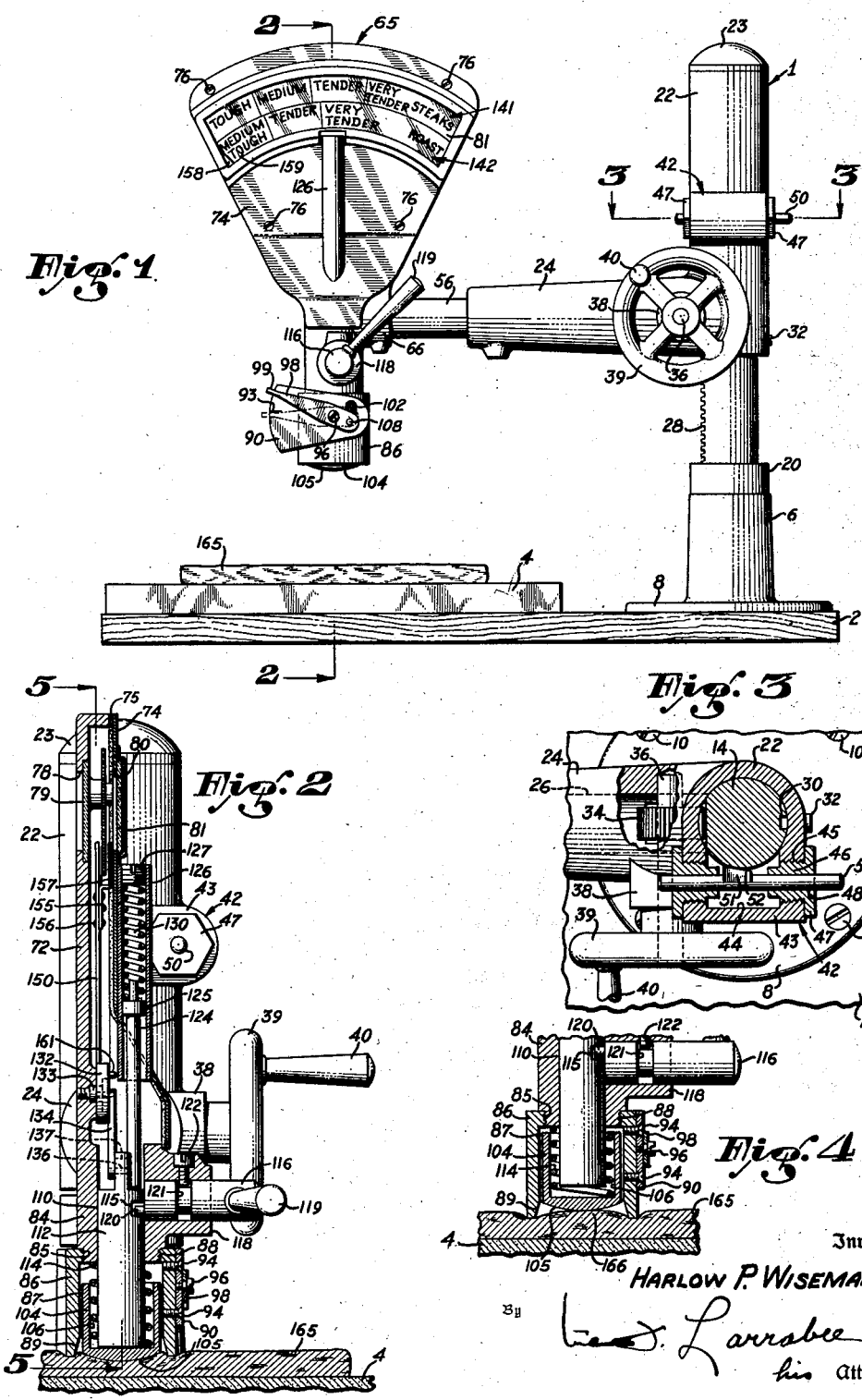

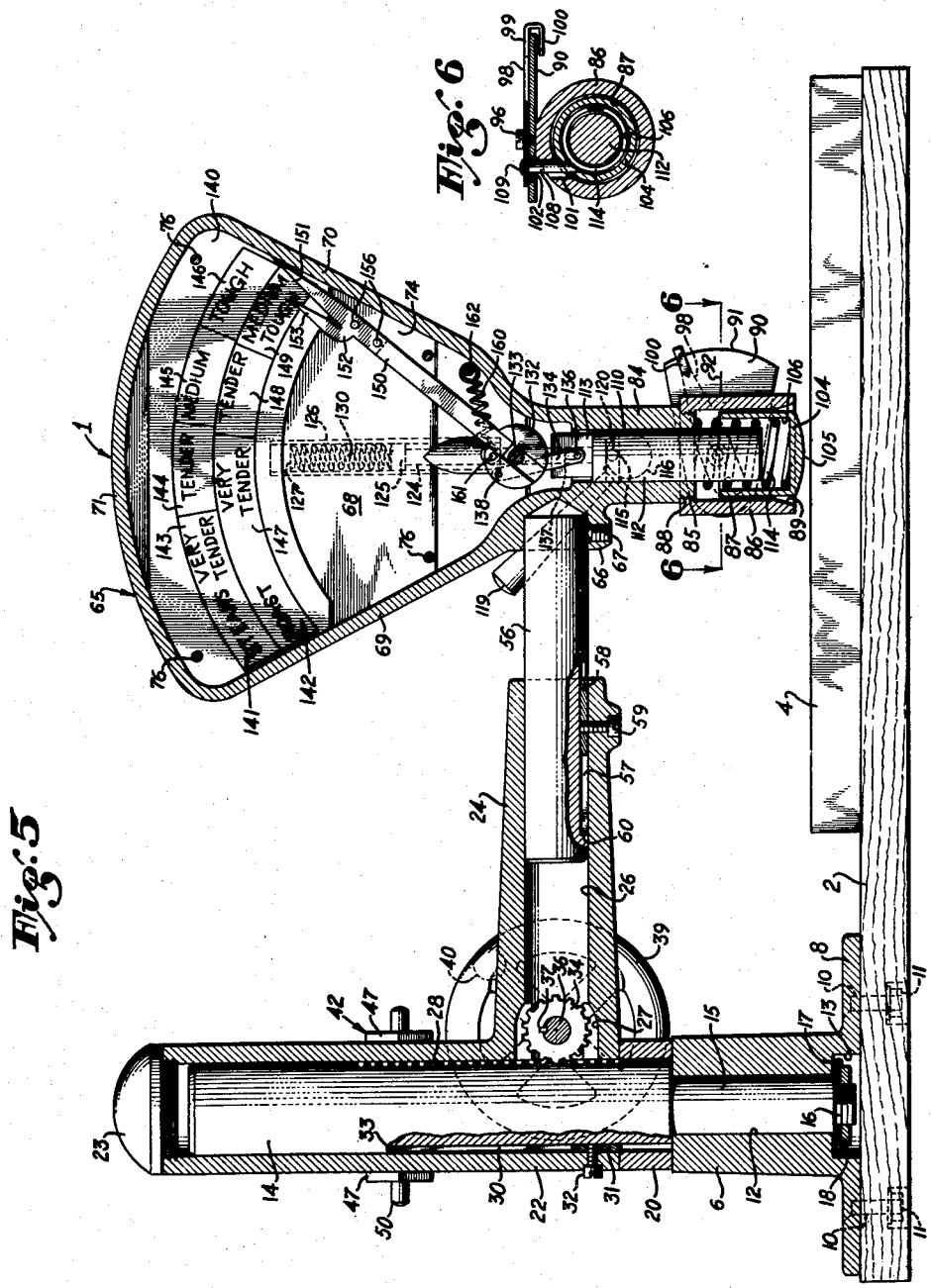

2,652,718

UNITED STATES PATENT OFFICE 2,652,718

DEVICE FOR TESTING MEAT TENDERNESS

Harlow P. Wiseman, Hermosa Beach, Calif.

Application January 28, 1949, Serial No. 73,297

6 Claims. (Cl. 73—78)

This invention relates to improvements in devices for testing the solidity or tenderness of meat before the meat is cooked.

It is well known that in the meat business heretofore the tenderness of a piece of meat has been generally tested by the butcher or customer grasping the meat between the thumb and first finger and applying pressure to the meat. As the sense of touch and the judgment to the tenderness of meat is not exactly the same with all individuals, some might say a certain piece of meat was tender, others might judge the same piece of meat to be very tender, while still others might say the same piece of meat was only medium tender. Thus, accuracy of judgment varies between different individuals. Therefore, to overcome the variance of opinion, I have provided a mechanical meat testing device which operates on the principle of squeezing the meat between the operating squeezing members of the device, which are a mechanical substitute for the squeezing of the meat between a person's fingers. But unlike various individuals' judgment, when a piece of meat is tested on a plurality of the devices, they will all register the same amount of solidity of the meat.

The general object of this invention is to provide a simple, inexpensive and easily operated device for testing the solidity or tenderness of a piece of meat.

Another object of the invention is to provide a meat testing device, including visual means indicating the solidity of meat viewable to both the customer and the dispenser.

A further object of the invention is to provide a meat testing device including means to apply a predetermined pressure to a confined area of the meat to be tested.

A still further object of the invention is to provide a meat testing device including means to apply a predetermined pressure around a selected area of meat and therafter apply other pressure to the confined area to determine the solidity of the meat.

My novel device is adapted to test meat for tenderness whereby the same may be cooked within a reasonable time after such testing to thereby indicate the approximate tenderness of the meat after the same has been cooked.

Other objects, advantages and features of my invention may appear from the accompanying drawing, the subjoined detail description, and the appended claims.

The accompanying drawings illustrate the invention in some of the forms I at present deem preferable.

Figure 1 is a rear elevation of my improved meat testing device. By rear I mean that elevation of the device viewed by the operator and not by the customer.

Fig. 2 is an enlarged fragmentary section taken on line 2—2 of Fig. 1 showing the foot of the device engaging a piece of meat and with the plunger released and forcing the test plug downward to an operative testing position.

Fig. 3 is an enlarged fragmentary transverse sectional view taken on line 3—3, Fig. 1.

Fig. 4 is a fragmentary view similar to Fig. 2 showing only the lower portion of the testing mechanism and shows the foot engaging a piece of meat but with the plunger in a raised position.

Fig. 5 is a longitudinal vertical section through the device taken on line 5—5 of Fig. 2 with the base and platform in elevation and with the testing device in a lowered inoperative position; and Fig. 6 is a section taken on line 6—6 of Fig. 5.

Referring to the drawings by reference characters, I have indicated my improved device generally at 1. As shown, the device 1 includes a wooden base member 2 having mounted thereon adjacent one end a platform member 4 which is preferably formed of a very hard material such as a piece of marble.

Adjacent the other end of the base 2 I provide a vertical bolster member 6 which includes an enlarged circular base flange 8 shown as secured to the base 2 by a plurality of countersunk bolts 10 and nuts 11. The bolster 6 has a central vertical bore 12 therein which opens through the top of the bolster and at the lower end communicates with an enlarged recess 13 opening through the bottom face of the base flange 11.

Supported by the bolster 6 I provide a vertical shaft 14 which includes a lower reduced portion 15 position in the bolster bore 12 and having a further reduced threaded portion 16 extending into the bolster recess 13. A washer 17 secured against the lower end of the reduced portion 15 by a nut 18 on the threaded portion 16 prevents upward vertical movement of the shaft while allowing it free rotation relative to the bolster.

Mounted on the shaft 14 I provide a sleeve member 22 which is vertically movable relative to the shaft 14. The upper end of the sleeve 22 is preferably closed by a cap 23 to prevent foreign matter from entering the sleeve. The sleeve 22 includes a horizontally extending elongated hub portion 24 having a co-axial bore 26 therein which opens through the outer end of the hub and at the opposite end communicates with the interior of the sleeve 22. Adjacent the sleeve 22 the hub 24 has an enlarged chamber 27 therein in axial alignment with the bore 26 and opening into the interior of the sleeve.

In the side of the shaft 14 towards the hub 24 there are provided a plurality of spur gear teeth forming a rack portion 28. To prevent relative rotative movement between the sleeve 22 and the shaft 14 I provide a keyway 30 in the shaft which is adapted to receive a key member 31 secured to the sleeve 22 by a screw 32.

The keyway 30 terminates a predetermined distance above the bottom of the sleeve 22 forming a shoulder 33 which when the sleeve is moved upward is engaged by the key 31 and prevents the complete removal of the sleeve from the shaft 14.

Positioned in the hub chamber 24 I provide a spur gear 34 mounted on and secured to a shaft 36 by a key 37. See Figs. 3 and 5. The spur gear 34 meshes with the shaft rack 28 and the gear shaft 36 is rotatably mounted in the hub 24 and extends out beyond one side thereof through a boss 38, exterior to which it has a hand wheel 39 mounted on and secured thereto. See Fig. 3. The hand wheel 39 is shown as provided with an operating handle 40 by means of which it is adapted to be rotated to rotate the shaft which in turn will rotate the gear 34 thereby either forcing the sleeve 22 to move upward or downward depending on the direction of rotation.

To retain the sleeve 22 in any desired vertically moved position on the shaft 14, I provide a clamping mechanism indicated generally at 42 and shown in detail in Fig. 3. As shown, the clamping mechanism includes a protruding housing portion 43 integral with the sleeve 22 and extending outward therefrom on the same side as the hand wheel 39 and a short distance thereabove. See Figs. 1 and 2. The housing 43 has a chamber 44 therein opening into the interior of the sleeve 22 and a pair of opposed co-axial threaded apertures 45, the axes of which extend parallel to the axis of the hub 24.

The apertures 45 are each closed by a threaded plug 46 having an enlarged hexagonal head 47 thereon. Each of the plugs 46 has a co-axial aperture 48 therein in which a rod is positioned for axial movement. The rod 50 at each end projects beyond the adjacent plug and intermediate the length thereof within the chamber 44 includes an enlarged portion 51, one face of which is tapered to form a cam surface 52. The cam surface 52 is towards the shaft 14 and when moved into tight engagement therewith by pressure applied to one end of the rod 50 will prevent vertical movement of the sleeve 22 relative to the shaft 14. Thus, the sleeve 22 may be releasably retained in any adjusted vertical position along the shaft 14.

Positioned in the bore 26 of the hub 24 I provide a bar 56 which is axially movable in the bore 26 and extends beyond the outer end of the hub 24. To prevent rotation of the bar 55 relative to the hub 24 I provide a keyway 57 in the bar which is adapted to receive a key member 58 secured to the hub 24 by a screw 59. The keyway 57 does not extend out through the inner end of the bar 56 but terminates a predetermined distance inward therefrom forming a shoulder 60 which when the bar 56 is moved outwardly engages the key 58 and prevents the bar from being completely removed from the hub 24.

A head casing member indicated generally at 65 is adapted to be mounted on the bar 56 and includs a bored boss 66 in which the outer end portion of the bar 56 is positioned and secured by a set screw 67 in the boss. Above the boss the casing is fan-shaped and has a chamber 68 therein defined by end walls 69 and 70, an arcuate top wall 71 and a front wall 72. Opposite the front wall 72 the rear face of the casing is open and is adapted to be closed by a cover plate 74. Between the cover plate 74 and the walls of the casing a gasket 75 is preferably provided to exclude foreign substances. The cover plate 74 is shown as secured to the casing by a plurality of screw members 76 which engage suitably threaded apertures provided in the front wall 72.

Adjacent the top thereof the front wall 72 has an elongated arcuate viewing aperture therein which is closed by a transparent glass member 79. (See Fig. 2.) Directly opposite the viewing aperture 78 in the front wall the cover plate 74 has a similarly shaped viewing aperture 80 therein which is closed by a transparent glass member 81. (See Figs. 1 and 2.)

The head casing 65 includes an integral annular hub portion 84 which depends below the boss 66 and terminates in a reduced threaded portion 85.

Depending from the hub 84 I provide an annular foot member or test plug housing member 86 having a recess 87 therein opening through the bottom face thereof. Opening through the upper face thereof and communicating with the recess 87 and coaxial therewith the foot has a secured threaded aperture 88 therein which is engaged by the threaded portion 85 of the hub 84. The lower portion of the foot recess 87 is preferably outwardly flared, as indicated at 89.

Mounted on the rear side of the foot member 86 I provide a pressure indicator plate 90, the edge 91 of which is arcuately shaped and projects outward beyond the foot in a direction away from the vertical shaft 14 and has on the rear face thereof an indicium 92 and on the front face an indicium 93. (See Figs. 1 and 5.) As clearly shown in Figs. 2 and 4, the pressure indicator plate 90 is secured to the hub 84 by a plurality of countersunk screws 94.

Pivotally mounted, intermediate its length, on a shouldered screw 96 secured to the plate 90 I provide a pressure indicator arm 98. The end of the arm 98 to the rear of the plate 90 includes a reduced rear indicator portion 99 adapted to coact with the indicium 93 upon certain operations of the device to be more fully explained hereinafter. (See Fig. 1.) The reduced portion 99 of the indicator arm extends beyond the arcuate edge 91 of the plate 90 and extends therearound and back upon itself to form a front pointer 100 adapted to coact with the indicium 92 on the front of the plate 90. (See Figs. 5 and 6.)

The foot member has a vertically elongated aperture 101 opening through the rear side thereof and communicating with the recess 87 intermediate the pivot screw 96 and the side thereof towards the vertical shaft 14.

In alignment with the aperture 101 of the foot 86 the indicator plate 90 has a similar aperture 102 therein.

Positioned in the recess 87 of the foot member 86 I provide a test plug 104. As shown, the test plug 104 is annular in cross section and of considerable less diameter than the diameter of the foot recess 87 to assure ample freedom of vertical movement. The lower face of the test plug 104 is imperforated and frusto-spherical as indicated at 105 and opening through the top thereof the test plug 104 has a recess 106 therein. Mounted in the test plug and extending rearwardly therefrom I provide a pin 108 which extends through the foot aperture 101 and the plate aperture 102 and is secured to the indicator arm 98 adjacent the end thereof opposite the pointer 100 as by riveting it thereto as indicated at 109. Thus, through the medium of the pin 108 vertical movement of the test plug 104 will rock the indicator arm 98. The pin 108 when it engages the bottom of the slot 101 limits the downward movement of the test plug 104.

The previously mentioned casing hub 84 has a coaxial vertical bore 110 therein, the upper end of which opens into the casing chamber 68 and the lower end of which opens through the bottom face of the reduced threaded portion 85 into the recess 87 of the foot 86. Positioned in the bore 110 I provide a plunger member 112, the lower portion of which extends below the reduced threaded portion 85 into the foot recess 87 and into the recess 106 of the test plug 104. The upper end of the plunger 112 includes a flattened portion 113 which projects upward into the casing chamber 68.

Surrounding the plunger 112 and positioned in the test plug recess 106 I provide a coiled expansion spring 114, the upper end of which bears against the lower face of the casing hub 84 and the lower end against the bottom of the test plug recess 106, thus normally urging the test plug 104 downward.

Adjacent the flattened portion 113 the plunger 112 has a transverse slot 115 in the rear side thereof. (See Figs. 2 and 4.)

Adjacent the plunger slot 115 I provide a rearwardly extending horizontal plunger lift shaft 116 which is rotatably mounted in a bore 117 provided in the casing hub 84 and an integral boss portion 118. The lift shaft 116 extends rearwardly from the boss 118 and adjacent the outer end thereof has an operating handle 119 secured thereto. Extending forwardly from the inner end thereof the lift shaft 116 includes a reduced excentrally located pin 120 which is adapted to be positioned in the plunger slot 115. Intermediate the length thereof the lift shaft 116 has a circumferential groove 121 therearound into which the end of a set screw 122, provided in the boss 118, projects to prevent axial movements of the lift shaft.

Extending upwardly therefrom to the rear of the flattened portion 113, the plunger 112 includes a reduced rod 124 which may be secured to the plunger rod in any desired manner such as by welding or brazing it thereto. The rod 124 adjacent the upper end thereof includes an enlarged head 125 positioned in a tubular housing 126 mounted on the rear of the cover plate 74 and having its lower end opening into the chamber 68. The upper end of the housing 126 is closed by a threaded plug 127. Positioned in the tubular housing 126 between the plug 127 and the rod head 125 I provide a coiled expansion spring 130 which acts to urge the rod 125 and the plunger 112 downwardly.

To move the plunger 112 upwards against the action of the spring 130 an operator rotates the lift shaft 116 through the medium of the handle 119 in a clockwise direction as viewed in Fig. 1, thereby moving the pin 120 to a position above the axis of the shaft 116. As the pin 120 is thus moved it engages the upper face of the plunger slot 115 and moves the plunger 112 upward to the positions shown in Figs. 4 and 5. To free the plunger 112 so the spring 130 can force it downward to the position shown in Fig. 2 the operator rotates the lift shaft 116 in an anti-clockwise direction as viewed in Fig. 1.

Positioned in the casing chamber 68 above the plunger 112 I provide a disc member 132 which is rotatably mounted on a shouldered stud screw 133 secured to the front wall 72 of the casing. (See Fig. 2.)

A link member 134 is pivotally connected adjacent its lower end to the flattened portion 113 of the plunger 112 as indicated in pin 136 and the opposite end of the link is pivotally connected by a pin 138 to the disc 132 to the side of the axis of the stud screw 133 towards the vertical shaft 14.

Adjacent the top of the casing 65 and within the chamber 68 I provide a dial plate 140 which is retained in position by the upper two cover screws 76. On each side thereof the dial plate has two indicia scales 141 and 142, the indicia scale 141 being titled "Steaks" and the scale 142 "Roasts." The steak scale 142 is shown as divided into four divisions—143, 144, 145 and 146 each indicating a different degree of condition of meat such as "Very Tender," "Tender," "Medium," and "Tough." The roast scale 142 is shown as divided into three divisions 147, 148 and 149 and like the steak scale divisions each indicating a different degree of condition of meat, such as "Very Tender,'" "Tender," and "Medium Tough." The two scales 141 and 142 on the front face of the dial 140 are aligned with the casing aperture 78 and are adapted to be viewed therethrough. Likewise, the scales 141 and 142 on the rear face of the dial 140 are aligned with the aperture 80 in the cover 74 and are adapted to be viewed therethrough.

Mounted on and secured to the disc 132 I provide a pointer arm 150 which extends towards the dial 140. The upper portion of the pointer arm 150 terminates in a tapered pointer portion 151 which is adapted to move across and indicate the divisions of the steak scale 141 on the front face of the dial 140. Slightly below the dial 140 the pointer arm 150 includes an offset portion 152 positioned to the side thereof towards the vertical shaft 14, which terminates in a tapered pointer portion 153. The pointer 153 is adapted to move across and indicate the divisions of the roast scale 142 on the front face of the dial 140. Mounted on the rear side of the pointer arm 150 below the dial 140 I provide an auxiliary pointer member 155. The auxiliary pointer member 155 may be secured to the pointer arm 150 as by riveting it thereto as indicated at 156 and includes a rearwardly extending offset portion 157 which overlays the rear face of the dial 140 and terminates in dual pointer portions 158 and 159 similar to the pointer portions 151 and 153. (See Fig. 1.) The pointer portion 158 coacts with the rear steak scale 141 in the same manner as the pointer 151 does with the front steak scale and the pointer 159 coacts with the rear roast scale 142 in the same manner as the pointer 153 does with the front roast scale.

Within the chamber 68 I provide a coiled tension spring 160 which at one end is attached to a pin 161 secured to the disc 132 and at the opposite end is anchored to a pin 162 mounted in the front wall of the casing. The spring 160 normally tends to rotate the disc 132 in a clockwise direction as viewed in Fig. 5, thereby urging the pointer arm 150 towards the casing end wall 70.

Normally, when not in use it is desirable to retain device 1 in the position shown in Fig. 5—that is, with the sleeve 22 resting on the collar 20, and the lift shaft 116 rotated to a position to retain the plunger 112 in a raised position as previously described and shown in Figs. 4 and 5. In this lowermost position of the device the lower face 105 of the test plug 104 is retained in spaced relation to the upper face of the platform.

When it is desired to test a piece of meat with the device 1 an operator, who operates the device from the rear thereof, that is the operator faces the device as viewed in Fig. 1, raises the sleeve 22 by rotating the handwheel 39 in a clockwise direction as previously described, thus raising the foot 86 a predetermined distance above the platform. If desired, the sleeve 22 may be retained in the raised position by correct operation of the clamping mechanism 42. That is by moving the rod 50 to a position wherein the cam face 52 tightly engages the vertical shaft 14. The operator then places a piece of meat, such as the piece of steak indicated at 165 in Figs. 1, 2 and 4, on the platform 4. Thereafter, the operator releases the clamping mechanism 42—that is, if the mechanism has previously been set to retain the device in a raised position, by moving the rod 50 to a position wherein the cam face 52 is out of engagement with the vertical shaft 14. The operator then rotates the hand wheel in an anti-clockwise position, thereby lowering the sleeve 22 until the foot 86 engages the meat 165. The operator then continues to rotate the wheel, thereby forcing the lower face of the foot downward into the meat 165 as shown in Fig. 4. Previous to the foot engaging the meat, the lower end 105 of the test plug 104 engages the meat and is moved upward thereby against the action of the spring 114. As the test plug 104 moves upward it moves the pointer arm 98 through the medium of the pin 108, swinging the pointer portions 99 and 100 downward. The operator continues to rotate the hand wheel 39 to force the foot 86 into the meat 165 until the test plug 104 has been moved upward a sufficient distance, whereby it has moved the indicator arm 98 to the phantom line position shown in Fig. 1 and has swung the pointer 100 into register with the indicium 92 on the front face of the indicator plate 90 and the top edge of the indicator portion 99 into register with the indicium 93 on the rear face of the indicator plate 90. When the indicators thus register with their associated indicia a predetermined pressure has been applied to the foot 86 to force it into the meat. As the foot 86 is forced downward the meat within the confines of the foot recess 106 rises slightly and forms a blister as indicated at 166 in Fig. 4. It is this blister which engages the lower face 105 of the test plug 104. After the indicators 99 and 100 register with their associated indicia the operator actuates the clamping mechanism 42 as previously described to retain the sleeve 22 and thereby through the various associated parts the foot 86 in the position to which it has been moved. Thereafter, the operator swings the lift shaft handle 119 anti-clockwise, thus likewise rotating the lift shaft 116 to move the pin 115 thereon past the vertical axis of the plunger 112. Whereupon, the spring 130 acting against the head 125 of the rod 124 forces the plunger 112 downward into engagement with the bottom of the test plug recess 106, forcing the lower end 105 of the test plug downward against the meat blister 166. The spring 130 is tensioned to a predetermined pressure and forces the lower end of the test plug 104 downward into the meat as shown in Fig. 2 a distance determined by the solidity of the meat. As the plunger 112 moves downward it rotates the disc 132 which in turn swings the indicator arm 150 towards the end wall 69 of the casing. The lower pivot pin 136 of the link 134 is positioned in a slot 137 provided in the flat portion 113 of the plunger 112 to allow the plunger to move downward into engagement with the bottom of the test plug recess 106 without actuating the pointer arm 150 before the test plug 104 actually starts to penetrate the meat. The distance the indicator arm 150 moves is governed by the depth of penetration of the test plug 104 into the meat. The more tender the meat the less solid it is so thus the test plug 104 will penetrate to a greater depth in the most tender of meat. Meats of less tenderness are more solid, so, therefore, as the solidity of the meat increases the test plug 104 will penetrate the meat to lesser distances. For instance, if the steak 165 being tested is very tender, which it is shown to be in Fig. 2, the end of the test plug 104 penetrates the meat to a maximum depth and the plunger 112 will, through the medium of the link 134 and the disc 132, swing the pointer arm 150 to its maximum travel in the direction towards the casing wall 69. In this position the pointers 151 and 158 will be positioned opposite the division 143 on the dial, thus indicating that the meat is very tender. As meat tested increases in solidity the pointer arm 150 comes to rest farther and farther from the casing wall 69 indicating, successively, tender, medium and tough. If, for instance, the meat being tested is indicated by the pointers 151 and 158 as being just out of the tender division 144 and into the medium division 145 on the steak scale 141, the pointers 153 and 159 would indicate on the roast scale 142 that it would make a very tender roast. As the pointers 151 and 158 move through the remainder of the length of the medium division 145 on the steak scale the pointers 153 and 159 would indicate that the piece of meat being tested would make a tender roast. As the pointers 151 and 158 move from the medium division 145 on the steak scale just into the tough division the pointers 153 and 159 will indicate that the meat being tested would make a tender roast.

To clean the platform 4 the sleeve 22 is moved to a raised position as shown in Fig. 1, latched up by the mechanism 42 and then it may be swung about the axis of the vertical shaft 14 thereby moving the casing to one side of the platform out of the way.

When the device 1 is used on a counter of a meat dispensing store the hand wheel 39 is directed towards the rear of the counter, thus the control wheel, the latch mechanism 42, and the lift shaft handle 119 are all readily accessible to an operator behind the counter. The operator of the device views the scales 141 and 142 on the rear face of the dial 140 through the aperture 80 in the cover 74 while a customer views the scales 141 and 142 on the front face of the dial 140 through the aperture 70 in the front wall 72 of the casing 65. Likewise, the operator observes the portion 99 of the pressure indicator arm 98 in relation to the indicium 93 on the rear face of the plate 90 while the customer observes the pointer portion 100 in relation to the indicium 92 on the front face of the plate 90. When a purchaser buys a piece of meat and has it tested in one store and at a later date desires the same degree of meat at another store having one of the testing devices he will be assured that if it registers the same on the second testing device as it did on the other testing device that the meat will be of the same degree of tenderness. Thus, the necessity of relying on the sense of touch and the accuracy of judgment between various butchers, which may vary greatly, is eliminated by use of my improved meat testing device.

Besides the devices being used only in meat dispensing stores, it may also be conveniently used in restaurants with very gratifying results.

I claim:

1. In a meat testing device, a vertically movable member, said member having an enlarged circular and hollow foot portion depending therefrom, a test plug positioned in said hollow foot portion and vertically movable relative thereto and having an imperforate lower face and a recess opening through the top thereof, means to move said foot into engagement with a piece of meat placed thereunder and apply a predetermined pressure to said meat; means to move said test plug into engagement with said meat and apply a predetermined pressure to said meat; and means extending into the recess in said test plug to engage and move the test plug into the meat.

2. In a meat testing device, a vertically movable member, said member having an enlarged circular and hollow foot portion depending therefrom, a test plug positioned in said hollow foot portion and vertically movable relative thereto and having an imperforate lower face and a recess opening through the top thereof, means to move said foot into engagement with a piece of meat placed thereunder and apply a predetermined pressure to said meat; means to move said test plug into engagement with said meat and apply a predetermined pressure to said meat; a plunger extending into the recess in said test plug to engage and move the test plug into the meat, an indicator coacting with a graduated scale to indicate the solidity of said meat; and means operably connecting the plunger and indicator to move said indicator upon movement of said test plug into the meat.

3. In a meat testing device, a platform, a casing member vertically movable above said platform, means to support said casing, means to vertically move said casing; means to retain said casing in adjusted vertically moved positions, an enlarged circular hollow foot portion depending from said casing and adapted to be moved into engagement with a piece of meat to be tested, a test plug positioned in said foot portion and vertically movable relative thereto and having an imperforate lower face and a recess opening through the top thereof, means to move said test plug below said casing and apply a predetermined pressure to said meat, a plunger extending into the recess in said test plug, and means engaging said plunger to move said test plug into engagement with said meat and apply a predetermined pressure to said meat.

4. In a meat testing device, a platform, a casing member vertically movable above said platform, means to support said casing, means to vertically move said casing; means to retain said casing in adjusted vertically moved positions, an enlarged circular hollow foot portion depending from said casing, a test plug positioned in said foot portion and vertically movable relative thereto and having an imperforate lower face and a recess opening through the top thereof, means to move said foot into engagement with a piece of meat positioned below the foot and to apply pressure to said piece of meat through the circular rim of said foot; means to move said test plug into engagement with said meat and apply a predetermined pressure thereto; a plunger extending into the recess in said test plug to engage and move the test plug into the meat; said casing including a graduated scale and an indicator member both visible from opposite sides thereof, means connecting said plunger and indicator member and operable to move said indicator member across the face of said scale to indicate the solidity of the meat being being tested when said plunger moves said test plug into the meat.

5. In a meat testing device, a platform, a casing member, means to support said casing for vertical and transverse movement above said platform, a test plug housing member depending from said casing and provided with a recess, a test plug positioned in said recess and vertically movable therein, means to limit the downward movement of said test plug, said test plug having an open-topped recess therein, a plunger vertically movable in said casing and extending downward into said test plug recess, a coiled spring surrounding said plunger and positioned in said test plug recess with the lower end thereof urging the bottom of said test plug downwardly, a pointer member pivotally mounted on said casing and a graduated scale supported on said casing, means to positively move said plunger upwardly out of engagement with said test plug, means to resiliently urge said plunger into engagement with said test plug to urge said test plug downwardly, and means operably connecting said plunger and pointer member to effect actuation of said pointer member across the face of said scale upon engagement of said plunger with said test plug.

6. In a meat testing device, a vertical standard, a platform, a casing member positioned above said platform, a sleeve member mounted on said standard and vertically movable relative thereto, means connecting said sleeve and said casing to support said casing, means to vertically move said sleeve relative to said standard and means to retain said sleeve in an adjusted vertically moved position, a test plug housing member depending from said casing and provided with a recess, a test plug positioned in said recess, resilient means urging said test plug downwardly, means to limit the downward movement of said test plug, a vertically movable plunger carried by said casing and adapted in one position to engage said test plug, positive means to move said plunger upwardly and retain it in a raised position, resilient means normally urging said plunger downwardly, said plunger when said retaining means is released being adapted to be moved downwardly by said associated resilient means into engagement with said test plug and move said test plug downward, a pointer member pivotally mounted on said casing, an associated scale member mounted in said casing, and means operably connecting said plunger and said pointer to effect actuation of said pointer upon engagement of said plunger with said test plug.

HARLOW P. WISEMAN.

References Cited in the file of this patent

UNITED STATES PATENTS

| Number | Name | Date |
|---|---|---|
| 1,232,782 | Field | July 10, 1917 |
| 1,519,602 | Zimmerman et al. | Dec. 16, 1924 |
| 1,822,662 | Letsch | Sept. 8, 1931 |
| 1,842,323 | Gluzek | Jan. 19, 1932 |
| 2,282,904 | Tea | May 12, 1942 |
| 2,446,956 | Ross | Aug. 10, 1948 |

FOREIGN PATENTS

| Number | Country | Date |
|---|---|---|
| 317,824 | France | June 6, 1902 |